United States Patent [19]

Roessner et al.

[11] Patent Number: 5,759,005
[45] Date of Patent: Jun. 2, 1998

[54] APPARATUS FOR REMOVING STACKABLE UNITS FROM A CONTAINER ON BOARD AN AIRCRAFT

[75] Inventors: Bernd Roessner, Rosengarten; Hinnerk Kleinwort, Hamburg, both of Germany

[73] Assignee: Daimler-Benz Aerospace Airbus GmbH, Hamburg, Germany

[21] Appl. No.: 529,141

[22] Filed: Sep. 15, 1995

[30] Foreign Application Priority Data

Sep. 17, 1994 [DE] Germany ............................ 44 33 234.3

[51] Int. Cl.⁶ ................................................ B65G 1/04
[52] U.S. Cl. .......................... 414/280; 414/786; 414/286; 244/118.1; 244/137.1
[58] Field of Search .................. 364/478.01; 414/786, 414/280, 269, 273, 277, 281, 286, 661; 244/118.1, 137.1; 186/40, 45, 46, 47, 49

[56] References Cited

U.S. PATENT DOCUMENTS

| Re. 32,176 | 6/1986 | Vernon . | |
|---|---|---|---|
| 4,007,846 | 2/1977 | Pipes | 414/280 X |
| 4,055,317 | 10/1977 | Greiss . | |
| 4,660,787 | 4/1987 | Sprenger . | |
| 4,804,307 | 2/1989 | Motoda . | |
| 5,074,496 | 12/1991 | Rezag et al. . | |
| 5,163,806 | 11/1992 | Robertson et al. . | |
| 5,205,515 | 4/1993 | Luria . | |
| 5,314,143 | 5/1994 | Luria . | |
| 5,322,244 | 6/1994 | Dallmann et al. . | |
| 5,496,000 | 3/1996 | Mueller | 244/118.1 |

FOREIGN PATENT DOCUMENTS

| 4029628 | 10/1991 | Germany . | |
|---|---|---|---|
| 308847 | 10/1959 | Switzerland | 414/280 |
| 537916 | 12/1976 | U.S.S.R. | 414/280 |

*Primary Examiner*—Frank E. Werner
*Attorney, Agent, or Firm*—W. G. Fasse; W. F. Fasse

[57] ABSTRACT

An apparatus is provided for removing stackable units containing food service items from a container having the form of a typical freight container, on board an aircraft. The apparatus cooperates with means for further transporting and then delivering the stackable units to an aircraft galley, and cooperates with a program controllable unit to allow the programmable handling of the stackable units. Arranged in the container (1) is a plurality of partition walls (10), each having a plurality of shelf ledges (15) to form a plurality of storage compartments (13) on the two opposite sides of an access alley (9). A handling unit (12) including a tower (22) on an undercarriage (12A) rides along rails (11) in the access alley (9). The tower (22) includes a plurality of receiver bins (19), with a motor driven engaging and entraining member (21) respectively arranged in each receiver bin (19). Each member (21) selectively engages respective coupling elements (16) and (17) provided on end faces of the stackable units (14). With this arrangement, the throughput rate of stackable units, such as meal service boxes, can be greatly increased.

19 Claims, 8 Drawing Sheets

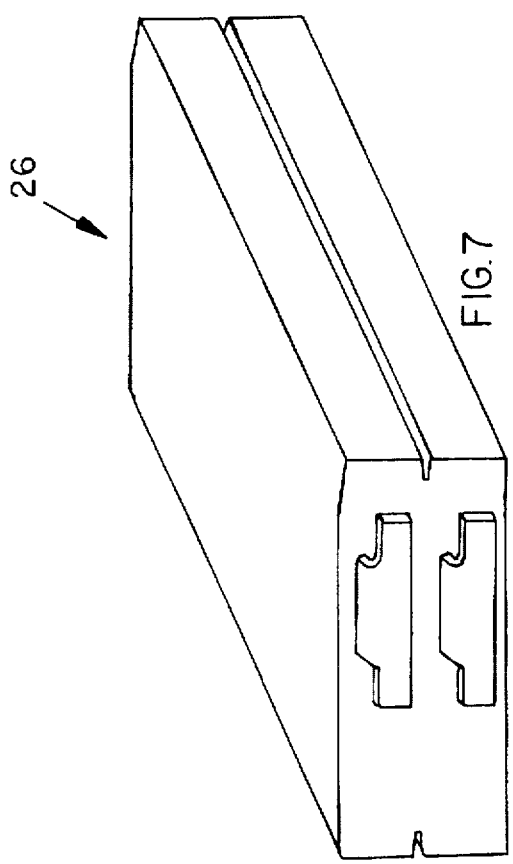
FIG.7
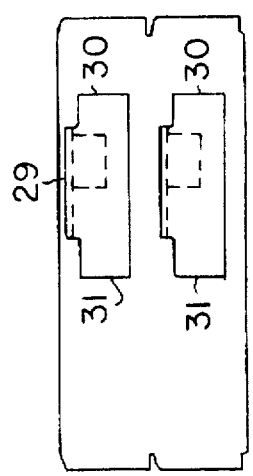
FIG.5
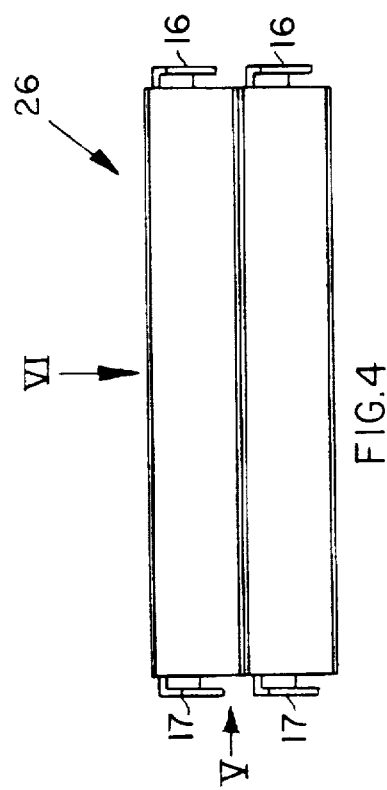
FIG.4
FIG.6

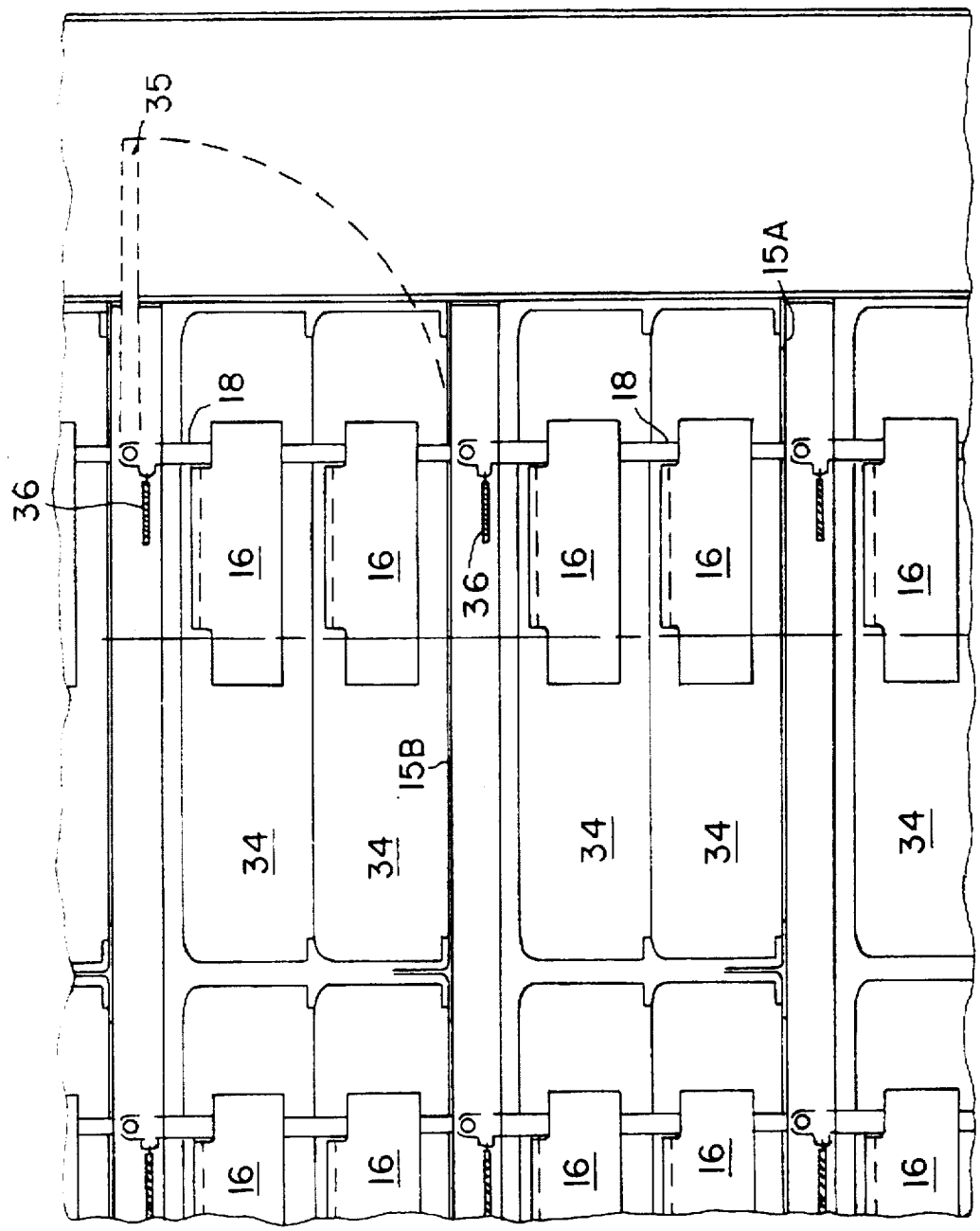

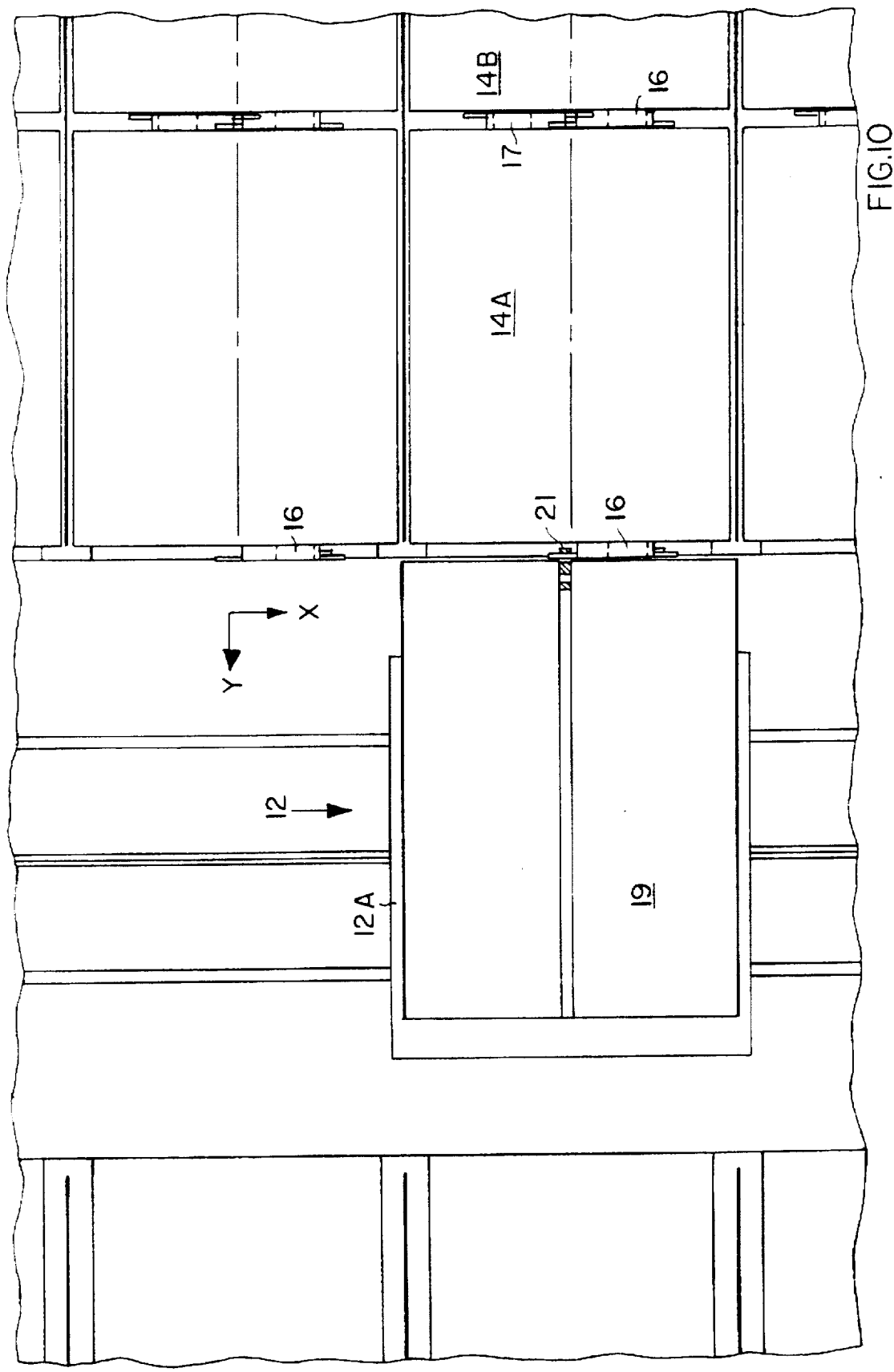

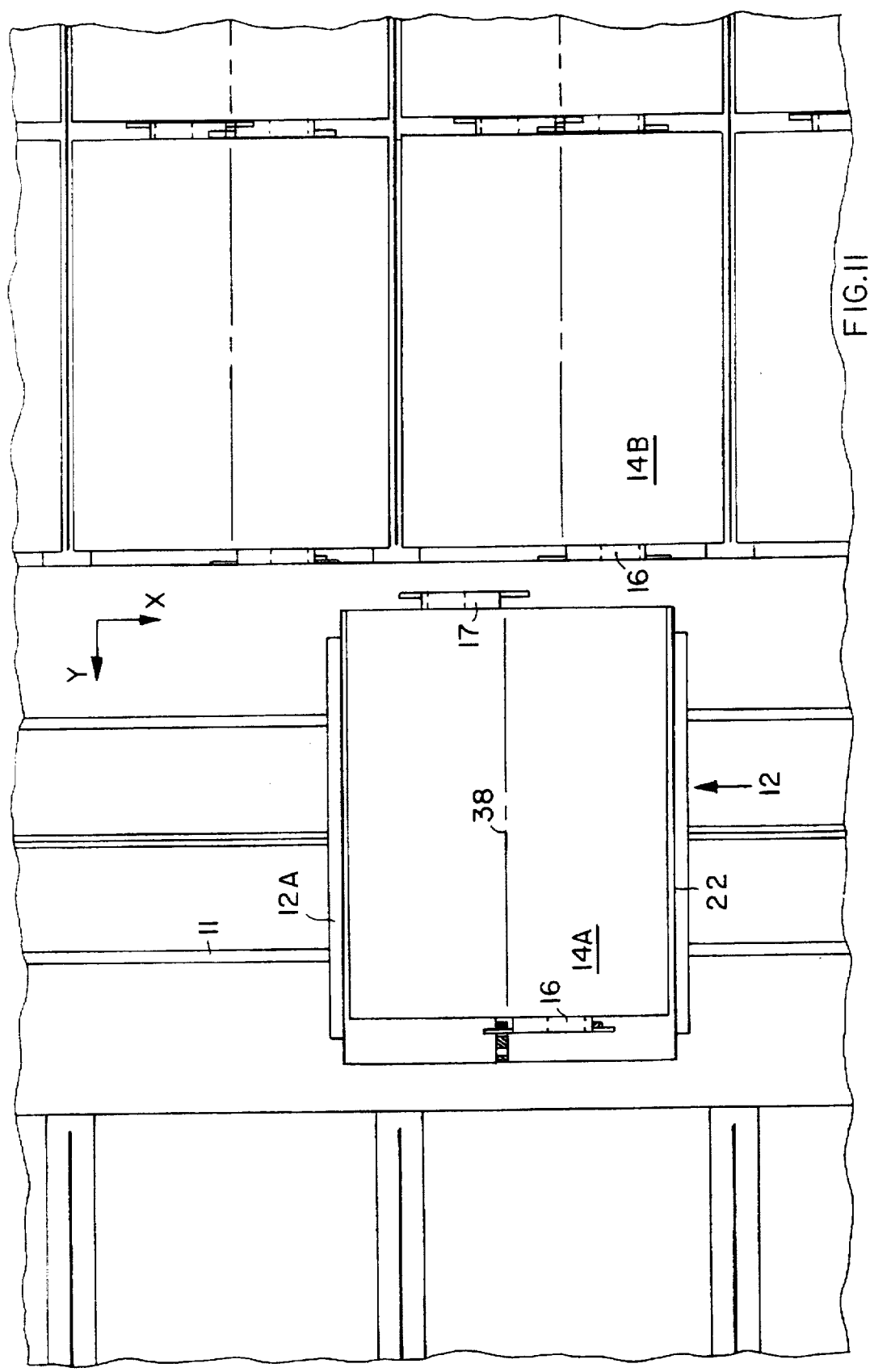

APPARATUS FOR REMOVING STACKABLE UNITS FROM A CONTAINER ON BOARD AN AIRCRAFT

CROSS-REFERENCE TO RELATED APPLICATION

The present application is related to our, commonly assigned application U.S. Ser. No. 08/189,880 filed on Feb. 1, 1994, now issued as U.S. Pat. 5,496,000 on Mar. 5, 1996, the disclosure of which is incorporated herein by reference.

FIELD OF THE INVENTION

The invention relates to an apparatus for removing stackable units from a container on board an aircraft, and relates to a corresponding stackable unit.

BACKGROUND INFORMATION

U.S. Pat. No. 5,074,496 (Rezag et al.) describes an apparatus for conveying meal and beverage items onboard an aircraft, whereby the meal and beverage items are first stored and then transported from the storage location to be finally distributed to the passengers. The prior art apparatus essentially comprises centrally arranged catering storage containers, which each have the outer form of a standard freight container, and at least one distribution station for handling and distributing the stored meal service items. The beverages and the meal items are packaged on meal trays, which in turn are stored in individual transport carts or trolleys, which further in turn are stored in the catering storage containers.

The prior art apparatus includes a transport arrangement that moves the trolleys vertically from the freight compartment into the galley areas of the aircraft by program-controllable movement sequences. The transport arrangement is positioned and fixed like a freight container in the freight compartment, in a position between two of the catering storage containers filled with trolleys containing food and beverage items, so that the transport arrangement can reach into both of the containers for removing selected trolleys therefrom.

A considerable disadvantage of the known apparatus is that the packing density of the stored provisions is rather low, because in addition to the required number of meal trays and beverage items, a corresponding number of the food service trolleys must also be stored in the storage containers.

The above-named related application, U.S. Ser. No. 08/189,880 (corresponding to German Patent application 4,302,706) relates to an apparatus for storing and handling meal and beverage items on board an aircraft, whereby the meal and beverage items are packed in menu boxes, which in turn are directly stored in a container having the format of a standard freight container. In other words, trolleys are not stored in the containers, but rather can remain in passenger deck areas such as galleys. Such an arrangement achieves a significant improvement in the packing density, because it is not necessary to store the trolleys within the freight containers, and the total number of trolleys required on the aircraft can be reduced.

The apparatus of the related application further includes a transport channel in which the menu boxes can be transported from the container, in a direction lengthwise along the cabin, to individual removal and distribution stations. In that arrangement, individual menu boxes are removed from the container and placed into the transport channel by a controllable unloading device arranged at the container. That system achieves many advantages, but the rate at which the menu boxes are removed from the container and fed into the transport channel would preferably be further improved, especially in aircraft where it is necessary to serve several hundred passengers in an expedient and uninterrupted manner.

OBJECTS OF THE INVENTION

In view of the above it is the aim of the invention to achieve the following objects singly or in combination:

- to provide an apparatus for removing stackable units from a container on board an aircraft, wherein meal and beverage items are stored in menu boxes in a relatively densely packed manner in a centrally located catering storage container, and wherein the retrieval and conveyance of stackable units containing the meal and beverage items to a transfer unit is substantially accelerated as compared to prior art systems;
- to reduce the total number of food service trolleys required on an aircraft and to reduce the wasted or dead space previously involved in storing trolleys and/or food service items, thereby reducing the total catering system weight and volume;
- to increase the total throughput rate of the catering system in transporting meal and beverage items from a storage container to the final distribution to passengers, so that passengers may be served meals more expeditiously; and
- to provide a particular configuration of a stackable unit that achieves an efficient use of storage space and a high packing density for food and beverage items and also enables the rapid and trouble-free removal of the stackable units from the storage containers and their transfer into a transport channel.

SUMMARY OF THE INVENTION

The above objects have been achieved in an apparatus for removing stackable units from a container on board an aircraft, wherein the container generally has the form of a typical freight container. According to the invention, a plurality of divider walls, each having a plurality of shelf ledges, are arranged in the container to form a respective plurality of pigeon hole storage compartments on both sides of an access alley provided in the container, for example running through the center of the container. A goods handling unit includes an undercarriage that is movably mounted on rails running along the access alley, and a tower that is movable relative to the undercarriage in a direction perpendicular to the rails.

The tower includes a plurality of receiver bins arranged one above another and having open ends facing the pigeon hole storage compartments. Each receiver bin includes a motor drivable engaging and entraining member that can move along linear guides into a position for engaging a coupling element provided on a respective corresponding stackable unit that has been stored in a corresponding one of the storage compartments.

A stackable unit according to the invention includes side walls, end walls and a bottom floor, with respective coupling elements provided on the end walls. The coupling elements on the two opposite end walls are preferably laterally offset in opposite directions from a lengthwise central plane of the stackable unit. The coupling elements preferably comprise two engaging tabs and a spacer member mounting the engaging tabs to the end wall.

By using the apparatus according to the invention, it is especially advantageous that the removal or output of stackable units from the container to a transfer unit is substantially accelerated in comparison to prior art systems.

BRIEF DESCRIPTION OF THE DRAWINGS

In order that the invention may be clearly understood, it will now be described, by way of example, with reference to the accompanying drawings, wherein:

FIG. 4 is a side view of a double box according to the invention;

FIG. 5 is an end view of the double box of FIG. 4, taken in the direction of arrow V in FIG. 4;

FIG. 6 is a top view of the double box of FIG. 4, taken in the direction of arrow VI in FIG. 4;

FIG. 7 is a perspective view of the double box of FIG. 4

FIG. 8 is an end view of stackable units or boxes, such as the double boxes of FIG. 4, arranged in the stacking space of the storage arrangement according to the invention;

FIG. 10 is a view similar to that of FIG. 9, but showing the goods handling unit moved into an extraction position; and FIG. 11 is a view similar to that of FIG. 10, but showing the goods handling unit moved into a transport position.

DETAILED DESCRIPTION OF PREFERRED EXAMPLE EMBODIMENTS AND OF THE BEST MODE OF THE INVENTION

Figure 1:
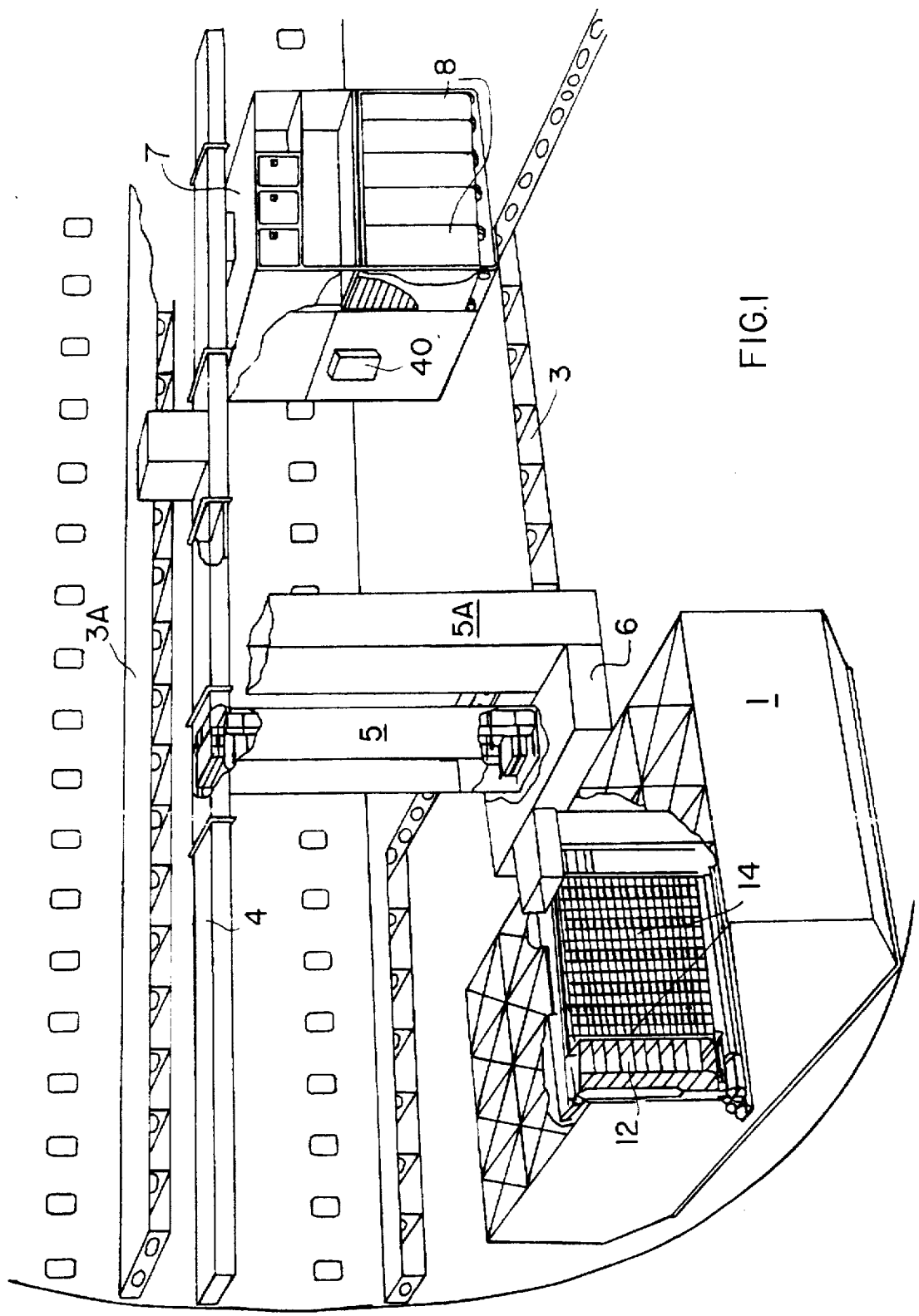
FIG. 1 is a perspective schematic overview of an apparatus for removing stackable units from a container according to the invention.

FIG. 1 is a general overview of an apparatus for removing stackable units 14, such as menu boxes for example, out of a container 1 having the general shape and dimensions of a typical freight container. The container 1 is positioned in the freight compartment of a large body aircraft, which has two passenger decks with respective deck floors 3 and 3A. The container 1 is arranged to cooperate with a food service or catering system, which will be described further below.

The stackable units 14 are stacked in storage shelf-like stacking spaces provided mirror-symmetrically on both sides of an access alley 9 of a certain prescribed width, which is free of stackable units and runs across the middle of the container 1, whereby the stackable units 14 are accessible to both sides of the access alley. The stacking spaces each respectively comprise a plurality of horizontal pigeon holes or storage compartments, and will be described in detail below.

A drivable goods handling unit 12 is arranged within the access alley 9, and is controlled by a corresponding programmable control (shown schematically at 40) to remove stackable units 14 out of the storage compartments and transfer them to an underfloor distributor 6. The distributor 6 is connected to two vertical conveyors 5 and 5A, which are each arranged in a first passenger deck and comprise a respective vertical shaft reaching from the freight compartment up to the second passenger deck. The portion of the wall of the container 1 located between the access alley 9 and the vertical conveyors 5 and 5A is removed before putting the apparatus of the invention into operation, so that the goods handling unit 12 can cooperate with the vertical conveyors 5 and 5A to transport the stackable units 14 out of the container 1.

Under the control of programmed commands, the goods handling unit 12 operates to remove a predetermined quantity of the stackable units 14 from the storage compartments in a single operation and transfers them to the underfloor distributor 6, which in turn transfers the respective stackable units 14 into one of the vertical conveyors 5 or 5A as needed. Each of the vertical conveyors 5 and 5A is connected to a respective lengthwise channel 4 running below the floor 3A of the second passenger deck. Only one of the lengthwise channels 4, namely the channel 4 connected to the vertical conveyor 5, is shown in FIG. 1 for the sake of clarity. The lengthwise channels 4 transport the stackable units 14 in a direction lengthwise along the passenger cabins to a distribution station 7 at a galley, at which the individual stackable units 14 are loaded into carts or trolleys 8.

The stackable units 14 cooperating with the apparatus of the invention are preferably twice as high or tall as typical menu boxes that are used for storing and serving the various components of a single passenger meal, for example. Therefore, all of the receiver bins and conveyor channels are dimensioned to match this format, namely twice as high as a typical menu box. Two different sizes of stackable boxes are provided according to the invention, namely a flat box and a double box. The flat box has the format of a typical menu box and differs therefrom in that it has a stronger construction and coupling elements 16 and 17 (which will be described below) arranged at the end surfaces thereof. In comparison, the double box has outer dimensions corresponding to two flat boxes stacked on top of one another. Therefore, a storage space intended for one stackable unit 14 can either receive one double box or two flat boxes stacked one on top of another. By providing the above described double boxes, it becomes possible to store bottles, cups, and the like in the menu boxes, while such items previously had to be stored and handled separately from the meal items.

Figure 2:
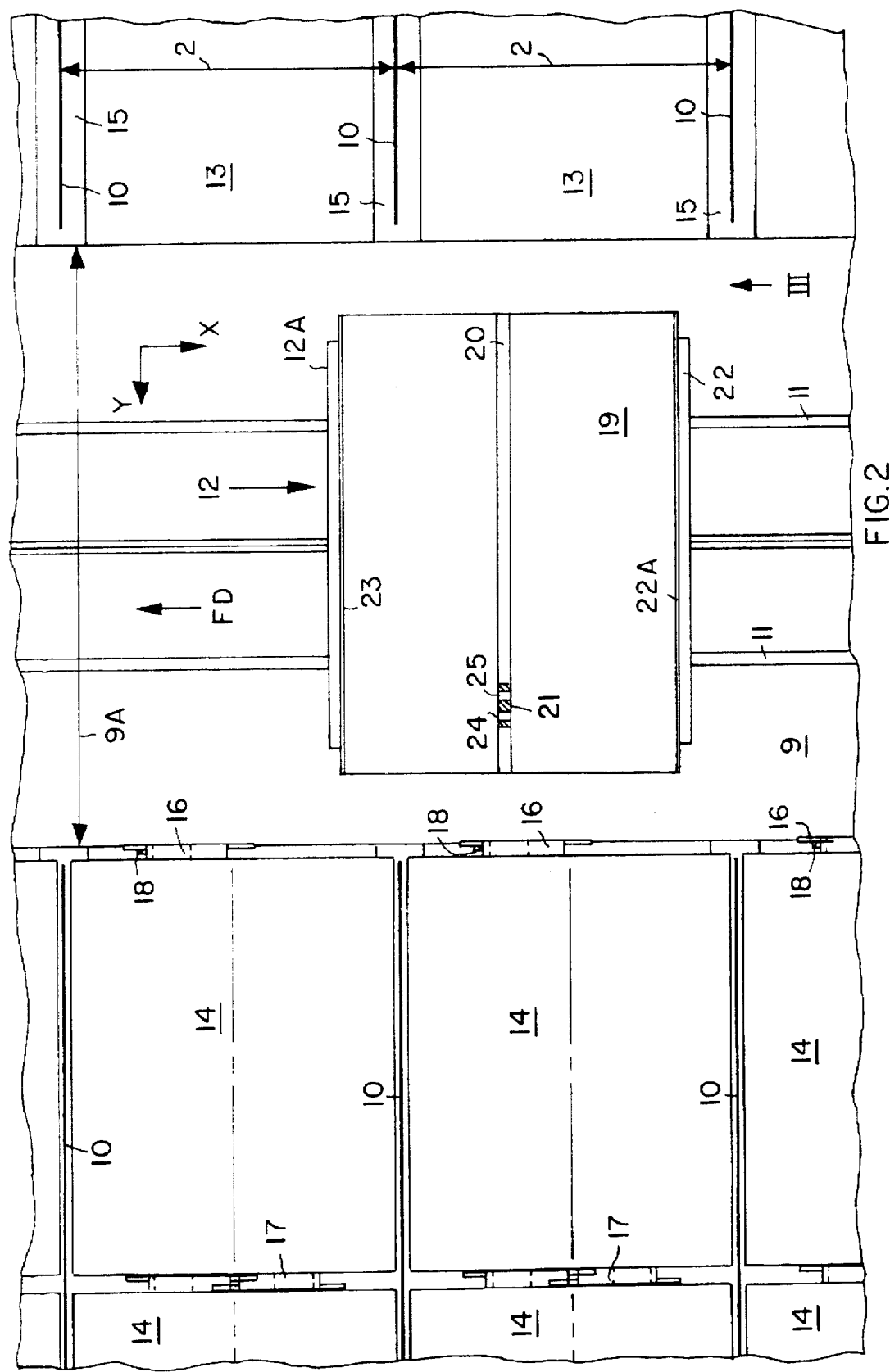
FIG. 2 is a partial top view of the container shown in FIG. 1, including a stackable unit removal apparatus.

FIG. 2 shows a partial top view of the catering storage container 1, wherein the upper wall of the container 1 has been removed for clarity. Arranged within the container 1 are the access alley 9 having a width 9A, a plurality of divider walls 10 shown in section, and the goods handling unit 12 which is movably mounted on rails 11. An undercarriage 12A having a controllable drive transports the goods handling unit 12 along the rails 11, either in the output conveying direction FD or opposite thereto. The coordinates X and Y define the approximately horizontal floor plane of the container 1, whereby the Z-direction extends perpendicularly from the X-Y plane, namely in the vertical direction opposite the viewing direction of FIG. 2.

The individual partition walls 10 begin at the lateral sides of the access alley 9 and extend from there in respective opposite directions, i.e. in the positive and negative Y direction, extending to the respective side wall of the container 1. The partition walls 10 each comprise a plurality of horizontal shelf ledges 15. The relative spacing 2 between adjacent partition wall 10 and between the shelf ledges 15, as well as the respective heights of the shelf ledges 15, are selected so that a respective shelf ledge 15 of one partition wall 10 cooperates with a shelf ledge 15 at the same height of an adjacent partition wall 10 to form a horizontal pigeon hole storage compartment 13 in which a stackable unit 14 may be inserted and stored. In their simplest form, the shelf ledges 15 may comprise slide-in rim lips of rails 15A simply protruding from the walls 10, or may comprise shelf panels 15B spanning the entire compartment width 2 between adjacent walls 10, or both (see FIG. 8). The depth of the several storage compartments 13 extends respectively from the access alley 9 to the corresponding side wall of the container 1. The storage compartments 13 on the right side of FIG. 2 are empty. In contrast thereto, the storage compartments 13 on the left side of FIG. 2 are filled with stackable units 14.

Each stackable unit 14 generally has a rectangular block shape, whereby the upper cover surface of each stackable unit 14 is shown in the top view of FIG. 2. A respective coupling element 16 is arranged on the first end surface of each stackable unit 14 facing toward the access alley 9. Corresponding coupling elements 17 having the identical form as the coupling elements 16 are provided on the opposite or second end surfaces of the stackable units 14. All of the stackable units 14 stored in a particular storage compartment 13 are coupled together to form a train of units 14, because the respective mating coupling elements 16 and 17 of adjacent stackable units 14 engage one another and are shape-locked together. All of the stackable units units 14 having a certain position in the X- and Y-directions, and being stacked above one another in the Z-direction, form a respective column of stackable units 14. The coupling and decoupling of the coupling elements 16 and 17 is achieved by laterally displacing or sliding one column of stackable units 14, in the X-direction, relative to another adjacent column of stackable units 14, whereby the coupling elements 16 and 17 are disengaged from one another. In order to secure the stackable units 14 stored in a storage compartment 13 against movement in the Y-direction, stop members 18 are provided on the divider walls 10 or the shelf ledges 15.

The goods handling unit 12 includes the undercarriage 12A as described above, as well as a tower 22, which extends in the Z-direction from the undercarriage 12A nearly up to the ceiling of the container 1, and which substantially comprises a frame that is open at its end or side facing the partition walls 10 in the view of FIG. 2. This frame is subdivided by a plurality of intermediate divider floors into a plurality of individual receiver bins 19, which are arranged in such a manner and configuration that when the goods handling unit 12 is properly positioned, each of the stored stackable units 14 will be exactly adjacent and aligned with an empty receiver bin 19. In each receiver bin 19, a respective engaging and entraining member 21 is movably arranged in a guide 20 that extends parallel to the outer side walls 22A and 23 of the tower 22. In FIG. 2, the engaging and entraining member 21 is positioned near the left end of the guide 20. The engaging and entraining member 21 is shown in section, and comprises two eyelets 24 and 25, which respectively can cooperate with one of the coupling elements 16 and 17. A respective drive is provided for operating each of the individual members 21, and is itself controllable by the program of the programmable control 40, for example. In the example embodiment shown in the figure, each member 21 can remove a stackable unit 14 from a storage compartment 13 on the right side of FIG. 2 as well a stackable unit 14 from a storage compartment 13 on the left side of FIG. 2.

In order to eject the stackable units 14 from the receiving bins 19 of the tower 22 and transfer the stackable units 14 to a transfer unit (which is not shown here), the engaging and entraining members 21 simultaneously push all of the stackable units 14 out of the receiver bins 19 and directly into corresponding compartments or bins of the transfer unit. By such a simultaneous transfer of a plurality of stackable units 14 into the transfer unit, the transfer rate or throughput can be considerably increased in comparison to previous systems. The transfer unit then carries out the further distribution or transport of the stackable units 14 into the conveyor channels leading to the vertical conveyors 5 and 5A.

The transport and transfer functions of the present apparatus are controlled by programmable control systems operating on generally known principles of digital automation. In this context, a central programmable control unit, indicated generally with reference number 40, serves to both coordinate the operation of the individual drives as well as take into consideration the data concerning storage administration. The drives used especially according to the invention are based on electromotors, wherein both d.c. motors, as well as stepper motors can be used. Appropriate sensors, such as proximity switches, light beams, end limit switches, and the like are used for monitoring the respective end positions of the drives. If required, it is also possible to use so-called path transmitters or transducers by which the individual movements can be tracked or sensed, and then corresponding information can be transmitted to the central control unit.

During operation of the system, empty stackable units 14 can be transported back into appropriate positions within the container 1 by the apparatus. In order to achieve this, the goods handling unit 12 is driven to a position for cooperating with the transfer unit, there takes over the empty stackable units 14 into its receiver bins 19, then brings the empty stackable units 14 into an appropriate storage location at which the storage compartments 13 have already been emptied according to the storage program. In this manner, the particular stackable units 14 specified for consumption are removed from the container 1 by and by during a flight, at appropriate times as needed, and then replaced by returned empty stackable units 14.

In the above described embodiment of the goods handling unit 12, the stackable units 14 are transported into or out of the receiver bins 19 of the tower 22 exclusively in the Y-direction, that is to say, in the positive or negative Y-direction. For this reason, the transfer unit, which is not shown, must be constructed in such a manner that the transfer of stackable units 14 from the tower 22 to the transfer unit can be carried out in the Y-direction.

Figure 3:
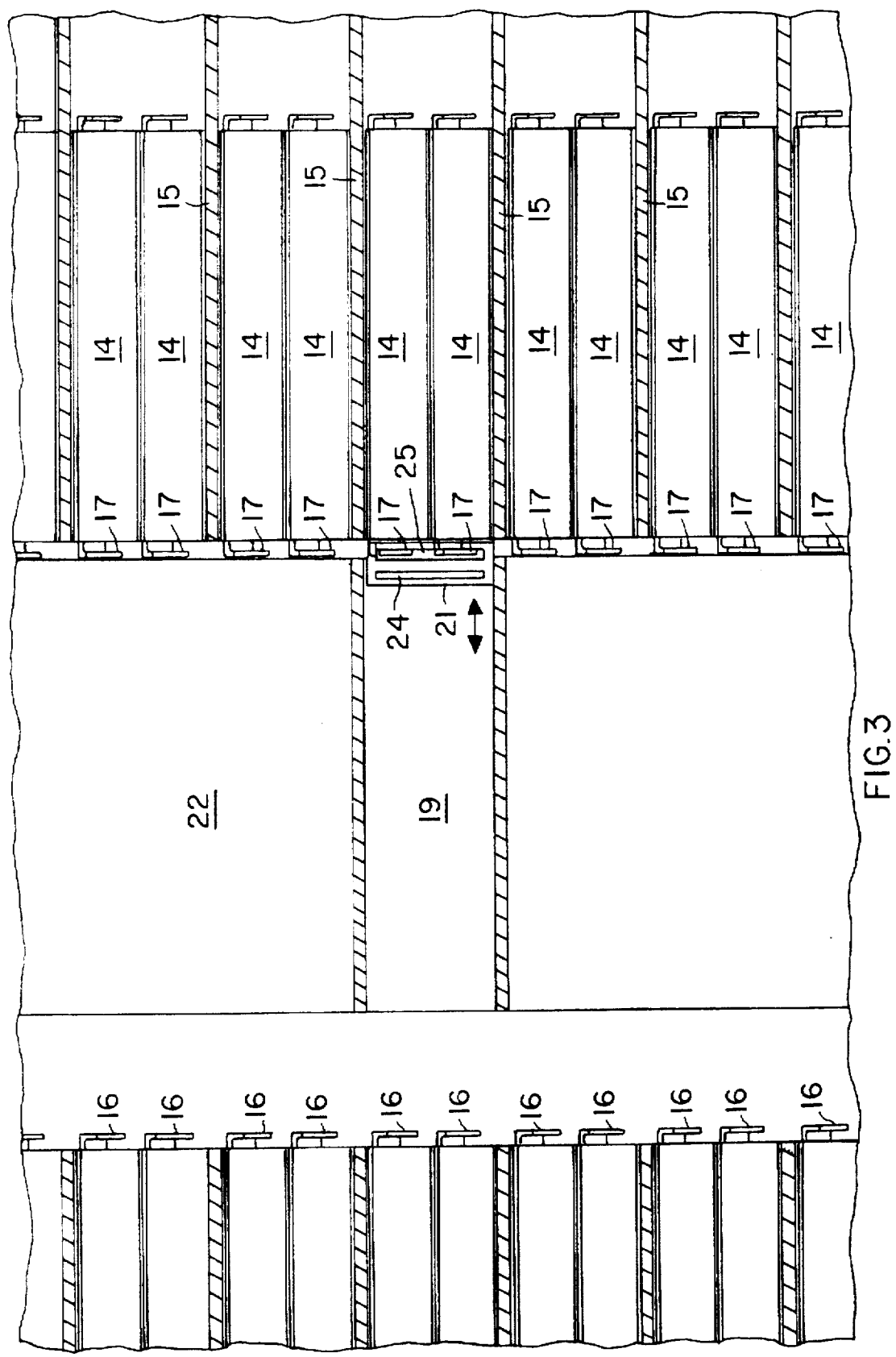
FIG. 3 is a sectioned partial side view of the apparatus shown in FIG. 2, taken in the direction of arrow III in FIG. 2.

FIG. 3 is a view in the direction of arrow III in FIG. 2, wherein the apparatus shown in the figure has been vertically sectioned to allow a view into the receiver bin 19 of the tower 22. For the sake of simplicity, only a single receiver bin 19 is shown, but the tower 22 includes a plurality of such bins. The engaging and entraining member 21 arranged in the receiver bin 19 has moved into a position at the right end of the receiver bin 19. In this position of the member 21, its eyelet 25 is positioned to engage the coupling elements 17 of the stackable unit 14 located between the shelf ledges 15. Thus, an X-direction motion of the tower 22 will engage the eyelet 25 with the coupling elements 17 so that the member 21 can pull the stackable unit 14 into the corresponding receiver bin 19. Due to its symmetrical configuration, the member 21 can function similarly at the left side of FIG. 3, whereby eyelet 24 of the member 21 can engage coupling elements 16 of the stackable units 14 stored to the left of the tower 22.

FIGS. 4 to 6 show a double box 26 having opposite end walls or surfaces 27 and 28, on which the coupling elements 16 and 17, which have an identical geometry, are attached. Each coupling element 16 and 17 essentially consists of a spacer 29 and two engagement ends or tabs 30 and 31. The coupling elements 16 and 17 arranged on opposite end surfaces 28 and 27 respectively, are offset from one another by an offset distance 33 relative to the lengthwise central plane 32 extending through the double box 26. Due to this arrangement, a plurality of double boxes 26 can be coupled together in the manner of a train by engaging the coupling elements 16 of one double box 26 with the coupling elements 17 of the next adjacent double box 26, as shown, for example in the top view of FIG. 2. FIG. 7 is a perspective view of a double box 26. Because of its increased vertical height, the double box 26 can be used to receive and store objects such as cups, glasses, and bottles, which cannot be stored in a flat box due to their size.

FIG. 8 is a view of a stackable space in the form of a storage rack, taken from a view point in the access alley 9. In each storage compartment, two flat boxes 34 are visible and additional flat boxes are stored in each storage compartment behind the first, visible flat boxes 34, being coupled together therewith in the manner of a train extending in the depth direction of the storage compartment. For each compartment, a stop member arrangement 18 is provided for securely locking the boxes stored in the respective compartment. In order to release the boxes in a particular storage compartment, the corresponding stop member 18 is moved from its vertical locking position into a substantially horizontal unlocking position 35 shown by dashed lines. This unlocking motion of the stop member 18 is carried out by a controllable electric drive, while a mechanical arrangement such as a spring 36 is provided to ensure that the stop member 18 automatically returns to its lock position in the event of a power failure.

Figure 9:
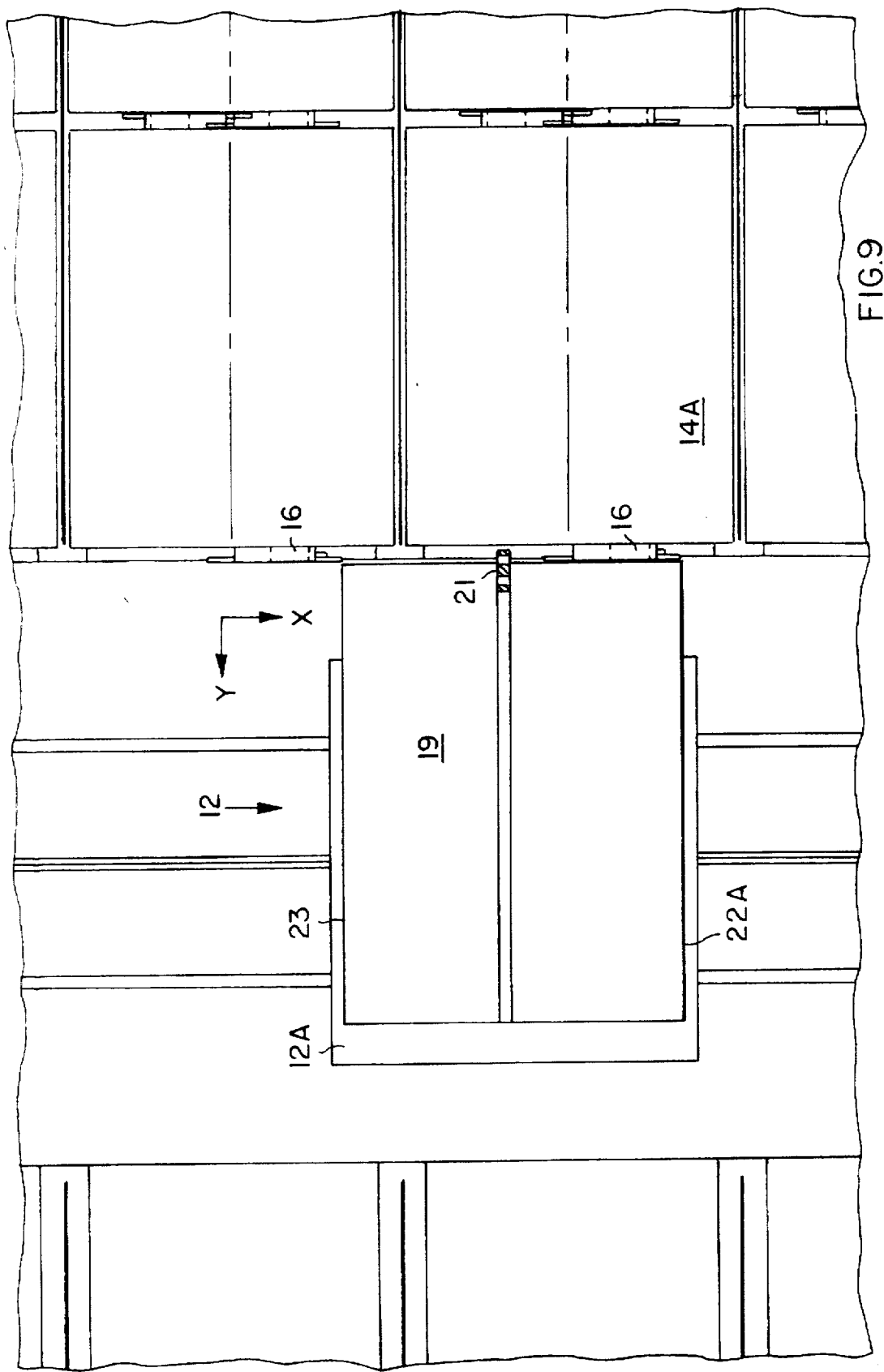
FIG. 9 is a schematic top view of a goods handling unit in a coupling position.

FIG. 9 shows the goods handling unit 12 of FIG. 2 in a coupling position. At the beginning of the removing process, all of the storage compartments 13 of the container 1 are filled with stackable units 14. In the illustrated example, all of the stackable units 14 are to be removed from the corresponding storage compartments 13. In order to achieve this, the goods handling unit 12 has moved toward a column of stackable units 14A, and the tower 22 has been shifted relative to the undercarriage 12A into a position toward the column of stackable units 14A. That is to say, the tower 22 has shifted in the negative Y-direction relative to the undercarriage 12A. All of the engaging and entraining members 21 have been moved to the right and extended so that the eyelets 25 will reach behind and thereby engage the coupling elements 16 of the stackable units 14A when the goods handling unit 12 is moved slightly in the X-direction. In this manner, the apparatus is placed into an extraction position.

FIG. 10 shows the goods handling unit 12 according to FIG. 9, but one step further in the operating sequence, namely in the extraction position. In this position, all of the engaging and entraining members 21 reach behind and engage the corresponding coupling elements 16, whereby all of the stackable units 14A are aligned exactly opposite and facing the empty receiver bins 19. In the next step of the operating sequence, the stackable units 14A are pulled into the frame of the goods handling unit 12 by moving the engaging and entraining members 21 in the Y-direction. This extraction motion, i.e. extracting stackable units 14A from compartments 13 and pulling them into the receiver bins 19, is stopped when the next adjacent stackable units 14B come into flush alignment with the front surface or edge of the storage rack formed by the divider walls 10 and shelf ledges 15.

At that point, the goods handling unit 12 is moved in the negative X-direction so that the stackable units 14A located within the receiver bins 19 of the goods handling unit 12 are disengaged from the next adjacent stackable units 14B that are still located in the storage compartments 13. In other words, the coupling elements 17 of the stackable units 14A are slid out from behind and disengaged from the coupling elements 16 of the next adjacent stackable units 14B. Once the stackable units 14A are completely moved into the receiver bin 19 of the goods handling unit 12, the stackable units 14A are located in the transport position.

FIG. 11 shows such a transport position, whereby the frame forming the tower 22 has also moved in a Y-direction relative to the undercarriage 12A to return to its original position on the undercarriage 12A. The column of stackable units 14A now located within the tower 22 can now be transported to a transfer unit, for example by driving the undercarriage 12A along the rails 11 to move the goods handling unit 12 in the negative X-direction.

Depending on the particular design and construction of the transfer unit, it may be most convenient to carry out the transfer of stackable units 14A from the tower 22 into the transfer unit in the positive Y- or negative Y-direction, as can simply be achieved by pushing the stackable units 14A back out of the tower 22 in the negative Y-direction, for example. However, it may also be desirable, for a particular configuration of the transfer unit, to transfer the stackable units 14A from the tower 22 to the transfer unit in the X- or negative X-direction. In order to achieve that, another embodiment of the invention provides that the tower 22 is arranged to be rotatable, in either rotation direction as desired, about a rotation axis 38 extending in parallel to the Z-direction, relative to the undercarriage 12A. The rotation can be driven as desired by a controllable rotation drive.

Although the invention has been described with reference to specific example embodiments, it will be appreciated that it is intended to cover all modifications and equivalents within the scope of the appended claims.

What is claimed is:

1. An apparatus for storing and removing from storage food or beverage items on board an aircraft, said apparatus comprising a storage container, a plurality of partition walls arranged in said container, a plurality of shelf ledges arranged on each of said partition walls to form a plurality of storage compartments delimited from one another by said partition walls and said shelf ledges, a plurality of stackable units respectively adapted to contain said food or beverage items and to be received in said storage compartments, an access alley devoid of said partition walls and extending alongside said storage compartments in said container, at least one track rail extending along said access alley in an X-direction, and a goods handling unit comprising an undercarriage arranged to move along said rail and a tower movably mounted on said undercarriage to be linearly movable relative to said undercarriage in a Y-direction perpendicular to said X-direction, wherein said tower comprises a plurality of receiver bins arranged one above another in said tower and having respective open ends facing said storage compartments, and a respective engaging and entraining member movably mounted on a linear guide arranged in each said receiver bin, and wherein each said stackable unit includes a coupling element adapted to be engaged by a corresponding one of said engaging and entraining members.

2. The apparatus of claim 1, wherein said storage container has an outer shape corresponding to that of a standard air freight container.

3. The apparatus of claim 1, further comprising a vertical conveyor shaft, a horizontal conveyor channel connected to said vertical conveyor shaft, and a transfer unit connected to said vertical conveyor shaft and cooperating with said goods handling unit to receive a plurality of said stackable units from said goods handling unit and to transfer said plurality of stackable units into said vertical conveyor shaft.

4. The apparatus of claim 1, further comprising respective drives interposed between said undercarriage and said track rail, between said tower and said undercarriage, and between said engaging and entraining member and said receiver bins, and comprising a programmable control unit connected to said drives to control operation of said drives and removal of said stackable units from said storage compartments.

5. The apparatus of claim 1, wherein said access alley is arranged substantially along a central plane of said storage container, and comprising a respective plurality of said partition walls with said shelf ledges forming respective pluralities of said storage compartments on each of two opposite sides of said access alley.

6. The apparatus of claim 1, wherein said tower is rotatably mounted on said undercarriage about a rotation axis extending parallel to a Z-direction that is perpendicular to said X-direction and to said Y-direction.

7. The apparatus of claim 6, further comprising a controllable rotation drive interposed between said tower and said undercarriage to rotate said tower about said rotation axis.

8. The apparatus of claim 1, wherein said shelf ledges comprise rim rails protruding laterally from said partition walls.

9. The apparatus of claim 1, wherein said shelf ledges comprise shelf panels extending between adjacent ones of said partition walls.

10. The apparatus of claim 1, further comprising a respective stop member arranged at each of said storage compartments and adapted to engage and fix said stackable unit in said storage compartment.

11. The apparatus of claim 1, wherein each of said storage compartments has a depth in said Y-direction that is at least twice a Y-direction length of said stackable units, and wherein a plurality of said stackable units are interconnected end-to-end by engagement of said coupling elements of successive adjacent ones of said stackable units to form a respective train of stackable units received in a respective one of said storage compartments.

12. The apparatus of claim 11, wherein said coupling elements of said successive adjacent ones of said stackable units are engageable and disengageable from each other by relative motion of said successive adjacent ones of said stackable units in a direction perpendicular to said Y-direction.

13. The apparatus of claim 1, wherein a first one of said coupling elements is arranged at a first end face of each of said stackable units, a second one of said coupling elements is arranged at a second end face opposite said first end face of each of said stackable units, said first and second coupling elements are laterally offset in opposite directions from a lengthwise central plane extending through said stackable unit from said first end face to said second end face, and each of said coupling elements has an identical configuration including two engagement tabs mounted on and spaced from said end face of said stackable unit by a spacer member.

14. The apparatus of claim 1, wherein said engaging and entraining member has an eyelet, each of said coupling elements has an engagement tab, and said eyelet is adapted to reach behind and engage said engagement tab.

15. The apparatus of claim 1, wherein each said stackable unit comprises two side walls, two end walls, a bottom floor, and two of said coupling elements arranged respectively on said two end walls.

16. The apparatus of claim 15, wherein each of said coupling elements comprises two engagement tabs and a spacer member connecting said engagement tabs to said respective end wall with a spacing between said engagement tabs and said respective end wall.

17. The apparatus of claim 15, wherein respective ones of said coupling elements are offset in opposite directions relative to each other from a lengthwise central plane extending through said stackable unit parallel to said side walls.

18. A method of using an apparatus for storing and removing from storage food or beverage items on board an aircraft, said apparatus including a storage container, a plurality of partition walls arranged in said container, a plurality of shelf ledges arranged on each of said partition walls to form a plurality of storage compartments delimited from one another by said partition walls and said shelf ledges, a plurality of stackable units respectively adapted to contain said food or beverage items and to be received in said storage compartments, an access alley devoid of said partition walls and extending alongside said storage compartments in said container, at least one track rail extending along said access alley in an X-direction, and a goods handling unit comprising an undercarriage arranged to move along said rail and a tower movably mounted on said undercarriage to be linearly movable relative to said undercarriage in a Y-direction perpendicular to said X-direction, wherein said tower comprises a plurality of receiver bins arranged one above another in said tower and having respective open ends facing said storage compartments, and a respective engaging and entraining member movably mounted on a linear guide arranged in each said receiver bin, wherein each said stackable unit includes a coupling element adapted to be engaged by a corresponding one of said engaging and entraining members, and wherein said storage compartments are arranged in rows and columns in said storage container, said method comprising:

(a) moving said undercarriage in said X-direction into alignment with a selected column of said storage compartments;

(b) moving said tower in said Y-direction toward said selected column of said storage compartments;

(c) moving said engaging and entraining members in said Y-direction toward said stackable units in said selected column of said storage compartments until said engaging and entraining members have moved through a plane normal to the Y-direction and passing through said coupling elements;

(d) moving said undercarriage in said X-direction to move said engaging and entraining members in said X-direction to reach behind and engage said coupling elements; and (e) moving said engaging and entraining members opposite said Y-direction to pull said stackable units out of said storage compartments and into said receiver bins.

19. The method of claim 18, wherein a plurality of said stackable units are linked together by said coupling elements to form a train of stackable units in each of said storage compartments, said method further comprising, after said step (e), moving said undercarriage opposite said X-direction to disengage said coupling elements of first stackable units of said trains from said coupling elements of second stackable units of said trains, and then at least either moving said engaging and entraining members farther opposite said Y-direction or moving said tower opposite said Y-direction to move said first stackable units and said handling unit clear of said storage compartments and said coupling elements of said second stackable units.

* * * * *